(12) United States Patent
Kobayashi

(10) Patent No.: US 6,661,132 B2
(45) Date of Patent: Dec. 9, 2003

(54) ROTOR FOR FLYWHEEL MAGNETO GENERATOR

(75) Inventor: Tatsuo Kobayashi, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/263,476

(22) Filed: Oct. 3, 2002

(65) Prior Publication Data

US 2003/0062787 A1 Apr. 3, 2003

(30) Foreign Application Priority Data

Oct. 3, 2001 (JP) .................................... 2001-307140
Sep. 20, 2002 (JP) .................................... 2002-275021

(51) Int. Cl.⁷ .......................... H02K 5/24; H02K 21/22; H02K 7/02
(52) U.S. Cl. .................... 310/51; 310/153; 310/74; 74/573 R
(58) Field of Search ............ 310/153, 51, 156.08, 310/74, 66, 152, 156.01, 261; 74/573 R, 574

(56) References Cited

U.S. PATENT DOCUMENTS

| | | | |
|---|---|---|---|
| 2,786,154 A | * | 3/1957 | Phelon et al. ............ 310/153 |
| 2,806,156 A | * | 9/1957 | Phelon .................... 310/153 |
| 2,929,944 A | * | 3/1960 | Shewmon ................. 310/51 |
| 3,193,713 A | * | 7/1965 | Larson et al. ............ 310/74 |
| 3,947,710 A | * | 3/1976 | Miyamoto ............... 310/153 |
| 4,137,884 A | * | 2/1979 | Odazima et al. ......... 310/153 |
| 4,241,620 A | * | 12/1980 | Pichl et al. ............. 74/573 R |
| 4,345,553 A | * | 8/1982 | Magrane et al. ......... 310/153 |
| 4,795,924 A | * | 1/1989 | Kamiyama et al. ...... 310/153 |
| 4,877,986 A | * | 10/1989 | Shimizu ................. 310/153 |
| 5,179,872 A | * | 1/1993 | Pernice .................. 310/153 |
| 5,998,902 A | * | 12/1999 | Sleder et al. ........... 310/153 |
| 6,242,828 B1 | * | 6/2001 | Rose, Sr. ................. 310/74 |
| 6,352,008 B1 | * | 3/2002 | Matsuoka et al. ......... 74/574 |
| 6,429,564 B1 | * | 8/2002 | Uemura et al. .......... 310/153 |
| 6,534,880 B1 | * | 3/2003 | Sone et al. .............. 310/153 |

FOREIGN PATENT DOCUMENTS

| | | | | |
|---|---|---|---|---|
| JP | 48-93308 | | 11/1973 | |
| JP | 58-131174 | | 9/1983 | |
| JP | 3-83451 | | 8/1991 | |
| JP | 04251536 A | * | 9/1992 | .......... H02K/21/22 |
| JP | 5-43772 | | 6/1993 | |

* cited by examiner

Primary Examiner—Nestor Ramirez
Assistant Examiner—Guillermo Perez
(74) Attorney, Agent, or Firm—Pearne & Gordon LLP

(57) ABSTRACT

A rotor for a flywheel magneto generator comprising a flywheel having a reluctor of projection provided on an outer face of a peripheral wall portion of the flywheel and a hole provided in a bottom wall portion of the flywheel at a position close to the reluctor for correcting static unbalance of the flywheel caused by a presence of the reluctor, the flywheel further comprising at least one recess provided in the peripheral wall portion of the flywheel on an end face thereof on the opening side of said peripheral wall portion for getting dynamic balance of the flywheel.

6 Claims, 8 Drawing Sheets

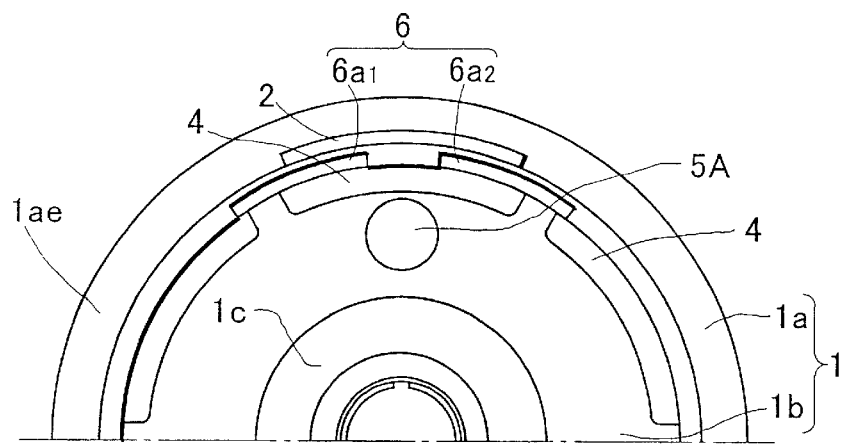
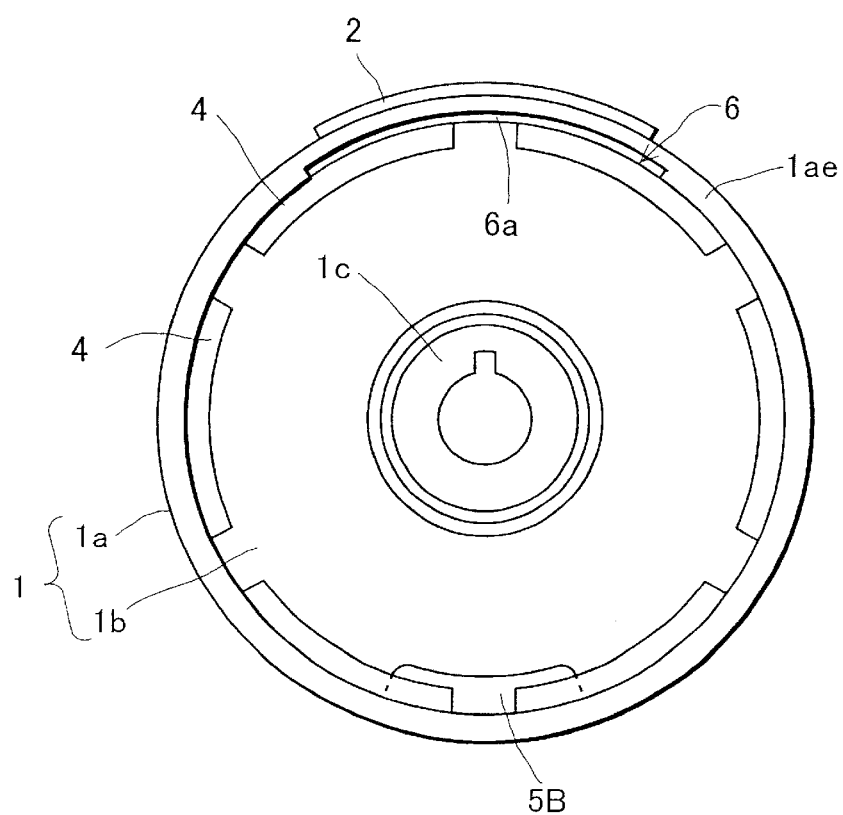

ROTOR FOR FLYWHEEL MAGNETO GENERATOR

TECHNICAL FIELD OF THE INVENTION

This invention relates to a rotor for a flywheel magneto generator having a reluctor provided thereon.

BACKGROUND OF THE INVENTION

A flywheel magneto generator has been used as a generator mounted on an engine. The flywheel magneto generator comprises a rotor mounted on a crankshaft of the engine and a stator secured to an engine case, for example. The rotor of the magneto generator comprises a cup shaped flywheel having a peripheral wall portion and a bottom wall portion provided so as to close one end of the peripheral wall portion as viewed in an axial direction and permanent magnets mounted on an inner face of the peripheral wall portion of the flywheel. A boss provided at a central portion of the bottom wall portion of the flywheel is secured to the crankshaft.

There is required information about a crank angle and a rotational speed for controlling the ignition timing of the engine and controlling the injection of the fuel. An inductor type signal generator is used for obtaining the information. The signal generator comprises a signal generating rotor having a signal generating reluctor (an inductor) of projection provided on an outer face thereof and rotated in synchronization with the engine and a stator called as a pulser. The pulser comprises an iron core having a magnetic pole portion to be faced with the reluctor, a pulser coil wound on the iron core and a permanent magnet magnetically connected with the iron core. A pulse signal is generated from the pulser coil when the reluctor begins being faced with the magnetic pole portion of the iron core of the pulser as the crankshaft of the engine rotates and when the reluctor finishes being faced with the magnetic pole portion of the iron core.

In many cases where a flywheel magneto generator is used as a generator mounted on the engine, the flywheel is used as the rotor of the pulser by providing the signal generating reluctor on an outer face of the peripheral wall portion of the flywheel.

The flywheel to be used as the rotor of the flywheel magneto generator is produced either by a press process or by a casting process or a thermally forging process.

FIGS. 7A and 7B show the rotor for the magneto generator having the flywheel produced by the press process. The flywheel 1 comprises a cylindrical peripheral wall portion 1a and a bottom wall portion 1b provided so as to close one end of the peripheral wall portion 1a as viewed in an axial direction of the flywheel 1. A boss 1c formed separately from the flywheel 1 is secured to a central portion of the bottom wall portion 1b by rivets, for example. A reluctor 2 is formed on the peripheral wall portion 1a of the flywheel 1 by embossing a portion of the peripheral wall portion 1a in a radial direction by the press processing. Permanent magnets 4 are attached onto an inner face of the peripheral wall portion 1a of the flywheel 1.

As the flywheel is produced by the press process in this manner, the reluctor 2 is formed by the press process after the flywheel 1 is produced and therefore a hollow portion 3 having a size mostly corresponding to that of the reluctor 2 is formed inside of the reluctor 2. FIGS. 8A, 8B, 9A, 9B and 10 show various rotors using the flywheel 1 produced by the casting process or the thermally forging process. In these rotors, the boss 1c is formed integrally with the bottom wall portion 1b of the flywheel 1. The reluctor 2 is formed on the outer face of the peripheral wall portion 1a of the flywheel 1 without forming any hollow portion inside of the reluctor 2.

Since the hollow portion 3 having the size mostly corresponding to that of the reluctor 2 is formed inside of the reluctor 2 in the case where the flywheel 1 is produced by the press process as shown in FIGS. 7A and 7B, troublesome breakdown of static balance of the flywheel 1 that tends to be caused by the presence of the reluctor 2 does not arise.

On the other hand, since no hollow portion is formed inside of the reluctor 2 in the case where the flywheel is produced either by the casting process or by the thermally forging process as shown in FIGS. 8A, 8B, 9A, 9B and 10, the breakdown of the static balance of the flywheel 1 that cannot be disregarded arises. Thus, as the static unbalance of the flywheel 1 that cannot be neglected arises due to the present of the reluctor in this manner, it is required to have the static balance of the flywheel 1 by providing static unbalance correction means such as a hole, a recess or a projection formed in the portion of the flywheel in order to correct the static unbalance of the flywheel.

When the static unbalance correction means is formed of the hole or the recess, it is provided closer to the reluctor relative to the center axis of the flywheel. In the case where the static unbalance correction means is formed of the projection, it is provided close to the side opposite to the reluctor relative to the boss of the flywheel.

The static unbalance correction means should be provided at a position where it is shifted in an axial direction of the flywheel relative to the reluctor so that it does not become an obstacle of the permanent magnets provided on the inner face of the flywheel and does not adversely affect the pulser.

In the example of FIGS. 8A and 8B, the static balance of the flywheel is maintained by the static unbalance correction means 5A of an extension hole provided in the bottom wall portion 1b of the flywheel 1 at a position adjacent to the reluctor 2.

In the example of FIGS. 9A and 9B, the static balance of the flywheel is maintained by the static unbalance correction means 5B of the projection provided on the inside of the bottom wall portion 1b of the flywheel 1 at a position opposite to the reluctor 2 relative to the boss portion 1c of the flywheel 1.

In the example of FIG. 10, the static balance of the flywheel is maintained by the static unbalance correction means 5C of the recess provided in the outer face of the bottom wall portion 1b of the flywheel 1 at a position adjacent to the reluctor 2.

As aforementioned, in the case where the static balance breaks due to the provision of the reluctor on the flywheel, the static unbalance correction means is provided in the state where it is shifted in the axial direction of the flywheel relative to the reluctor. However, if the static unbalance correction means is shifted in the axial direction of the flywheel relative to the reluctor as aforementioned, then there occurs the problem that the dynamic balance of the flywheel breaks. Particularly, as the width of the reluctor gets larger and the mass of the reluctor gets larger, the breakdown of the dynamic balance cannot get disregarded and the vibration of the rotor when the engine rotates at a high speed disadvantageously becomes larger. As the vibration of the rotor when the engine rotates at the high speed becomes larger, the waveform of the output of the pulser is possibly distorted or a noise possibly arises from the pulser due to variation in an air gap between the reluctor and a not shown magnetic pole portion of the pulser.

SUMMARY OF THE INVENTION

Accordingly, it is a principal object of the invention to provide a rotor of a flywheel magneto generator adapted to correct a breakdown of dynamic balance caused by static unbalance correction means.

The invention is applied to a flywheel magneto generator comprising a flywheel having a peripheral wall portion and a bottom wall portion to close one end of the peripheral wall portion as viewed in an axial direction with a reluctor of projection provided on an outer face of the peripheral wall portion and permanent magnets provided on an inner face of the peripheral wall portion of the flywheel, wherein static unbalance correction means to correct static unbalance of the flywheel caused by the presence of the reluctor is provided on the flywheel at a position where it is shifted to one side of the flywheel as viewed in an axial direction thereof relative to a center of the reluctor. In the present invention, the flywheel further comprises dynamic unbalance correction means to correct dynamic unbalance of the flywheel caused by the static unbalance correction means and the reluctor. The dynamic unbalance correction means is provided at a position where it is shifted to the other side of the flywheel relative to the reluctor as viewed in the axial direction.

In the case where the static unbalance correction means is provided on the bottom wall portion of the flywheel at the position where it is closer to the reluctor, a recess or recesses for the dynamic unbalance correction means may be preferably formed in an end face of the bottom wall portion on the other side in the axial direction at the position closer to the reluctor.

The dynamic unbalance correction means may be preferably provided so that the composite moment of the static balance moment of the static unbalance correction means and the static balance moment of the dynamic unbalance correction means is balanced with the static balance moment of the reluctor.

With the dynamic unbalance correction means provided as aforementioned, the breakdown of the dynamic balance caused by the provision of the static unbalance correction means can be corrected so as to maintain the dynamic balance of the flywheel, whereby the troublesome vibration of the rotor when the engine rotates at the high speed can be prevented.

BRIEF DESCRIPTION OF THE DRAWINGS

The above and other objects and features of the invention will be apparent from the detailed description of the preferred embodiment of the invention, which is described and illustrated with reference to the accompanying drawings, in which;

FIG. 4 is a front view of a rotor for a flywheel magneto generator constructed in accordance with further embodiment of the invention;

FIG. 5 is a front view of a rotor for a flywheel magneto generator constructed in accordance with further different embodiment of the invention;

DETAILED DESCRIPTION OF PREFERRED EMBODIMENTS

Figure 1A:
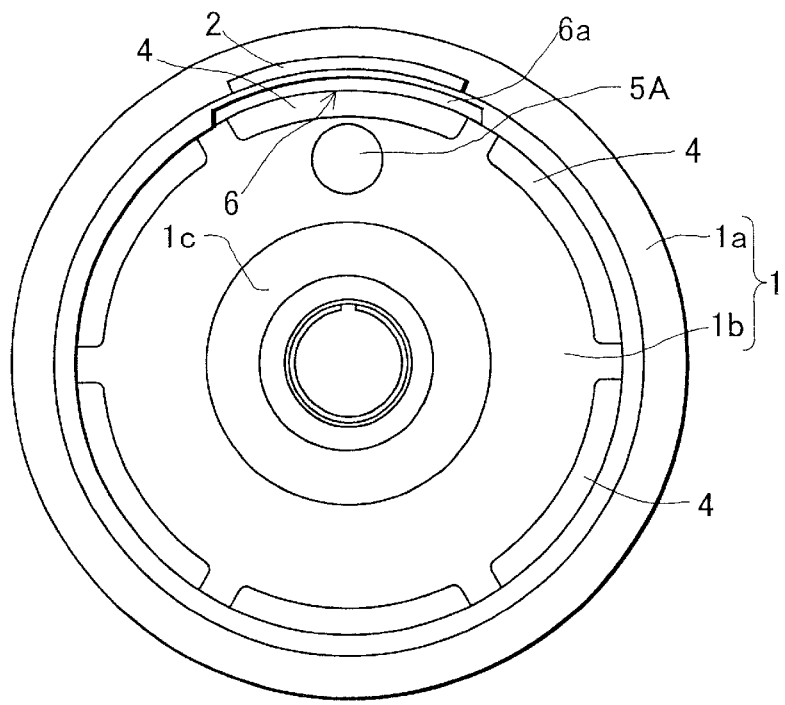
FIG. 1A is a front view of a rotor for a flywheel magneto generator constructed in accordance with one embodiment of the invention.
Figure 1B:
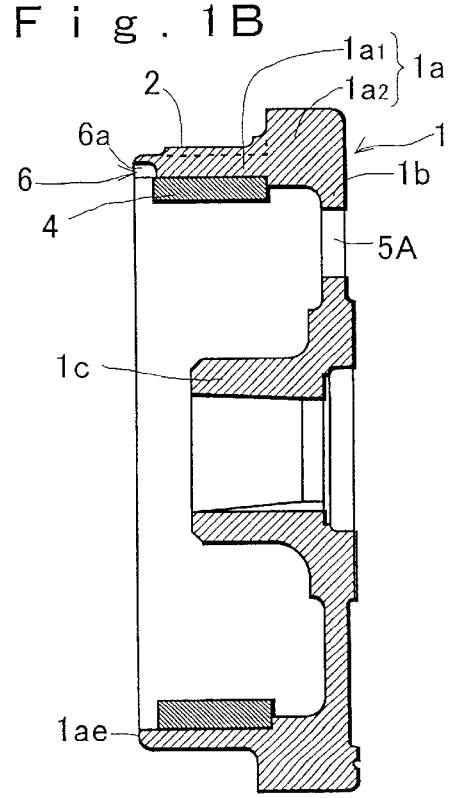
FIG. 1B is a longitudinal sectional view of the rotor of FIG. 1A.

A rotor for a flywheel magneto generator constructed in accordance with a first embodiment of the invention is shown in FIGS. 1A and 1B.

A flywheel designated by the numeral 1 in these figures is formed by a casting process and has a cylindrical peripheral wall portion 1a and a bottom wall portion 1b provided so as to close one end of the peripheral wall portion 1a as viewed in an axial direction of the flywheel 1. A boss portion 1c for mounting the flywheel 1 on a rotational shaft is formed integrally with a central portion of the bottom wall portion 1b. The peripheral wall portion 1a of the flywheel 1 comprises a first portion 1a1 extending from the other end side (the opening end side) of the flywheel 1 as viewed in an axial direction of the flywheel 1 to the position far from the bottom wall portion 1b and a second portion 1a2 closer to the bottom wall portion 1b and having a diameter larger than that of the first portion 1a1. A reluctor 2 of arc-like projection for a pulser extending in a peripheral direction of the peripheral wall portion 1a is formed on the outer face of the first portion 1a1. A plurality of arc-like permanent magnets 4 are secured by adhesives to an inner face of the peripheral wall portion 1a of the flywheel 1. The flywheel 1 and the permanent magnets 4 construct the rotor for the flywheel magneto generator. The rotor at its boss portion 1c is engaged with a crankshaft of an engine and the boss portion 1c is tightened to the crankshaft by not shown tightening means to secure the rotor to the engine.

A stator (not shown) for the magneto generator fixed to an engine case or the like is disposed inside of the flywheel 1 and constructs the flywheel magneto generator together with the rotor comprising the flywheel 1 and the magnets 4. The not shown stator comprises an iron core having a magnetic pole portion facing the magnetic poles of the magnets 4 of the rotor and an armature coil wound on the iron core and serves to induce an AC voltage in the armature coil while synchronizing with the rotation of the crankshaft.

The flywheel 1 also forms a signal generating rotor, and a signal generator is constructed by the rotor and a not shown pulser secured to the engine case.

The pulser comprises an iron core having a magnetic pole portion facing the reluctor, a pulser coil wound on the iron core and a permanent magnet magnetically bonded to the iron core. The pulser outputs a pulse signal from the pulser coil as the crankshaft rotates when the reluctor begins facing the magnetic pole portion of the iron core of the pulser and when the former finishes facing the latter, respectively.

In order to get the static balance of the flywheel by correcting the static unbalance of the flywheel caused by the provision of the reluctor 2, there is provided static unbalance correction means 5A of an extension hole formed in the bottom wall portion 1b of the flywheel 1 at a position closer to the reluctor 2. The static unbalance correction means 5A may be formed at the same time when the flywheel 1 is cast or may be formed by mechanical processing after it is cast.

As the static unbalance correction means 5A is provided at the position where it is shifted in an axial direction relative to the reluctor 2 as aforementioned, the dynamic balance of the flywheel is broken and therefore the axis of the crankshaft is deflected as the engine rotates at the high speed whereby there occurs the vibration of the flywheel which cannot be disregarded. As the flywheel 1 vibrates, the air gap irregularly varies between the reluctor 2 and the magnetic pole portion of the not shown pulser and, as a result, the waveform of the output of the pulser is distorted and a noise possibly occurs from the pulser when it is not expected.

In this invention, in order to correct the dynamic unbalance of the flywheel 1 caused by the static unbalance correction means 5A and the reluctor 2, there is provided dynamic unbalance correction means 6 of an arc-like recess 6a extending in the peripheral direction of the peripheral wall portion 1a of the flywheel 1 and formed in the end face 1ae of the peripheral wall portion 1a of the flywheel on the other side (the opening side) in the axial direction thereof and at a position closer to the reluctor 2. In the illustrated embodiment, the recess 6a for the dynamic unbalance correction means 6 may be formed by removing a portion of metal, which the side end of the opening side end is formed of, from the inner peripheral side of the opening side end of the peripheral wall portion 1a of the flywheel 1. The recess 6a is provided so as to have a central position thereof as viewed in the peripheral direction corresponding to the position of the reluctor 2 and both ends of the recess 6a terminate at positions exceeding the both ends of the reluctor 2 in the peripheral direction thereof.

The recess 6a for the dynamic unbalance correction means 6 may be formed at the same time when the flywheel 1 is cast or may be formed by cutting a portion of the end face of the peripheral wall portion 1a of the flywheel 1 after the flywheel is produced.

Figure 2:
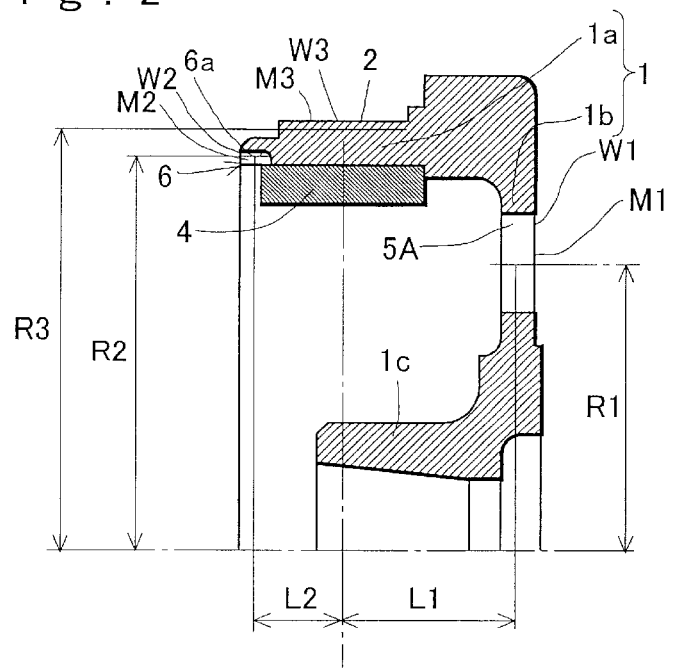
FIG. 2 is an enlarged cross sectional view of the rotor of FIG. 1B for illustrating how the dynamic balance of the rotor of the invention is maintained.

How the dynamic unbalance correction means 6 is provided will be described with reference to FIG. 2 hereinafter. In FIG. 2, "W1" indicates the mass of metal removed for forming the extension hole for the static unbalance correction means 5A, "W2" indicates the mass of metal removed for producing the recess 6a for the dynamic unbalance correction means 6, and "W3" indicates the mass of the reluctor 2. "R1" is a distance between the center of gravity of the static unbalance correction means 5A and the center axis of rotation of the flywheel 1 (the rotational radius of the static unbalance correction means 5A), "R2" is a distance between the center of gravity of the dynamic unbalance correction means 6 and the center axis of rotation of the flywheel 1 (the rotational radius of the dynamic unbalance correction means 6), and "R3" is a distance between the center of gravity of the reluctor 2 and the center axis of rotation of the flywheel 1 (the rotational radius of the reluctor 2). "L1" is an axial distance between the center (the center of the axial direction) of the reluctor 2 and the center of gravity of the static unbalance correction means 5A (a distance between the center of rotation of the reluctor 2 and the center of rotation of the static unbalance correction means 5A), and "L2" is an axial distance between the center of the reluctor 2 and the center of gravity of the dynamic unbalance correction means 6. Finally, "M1" is static balance moment of the static unbalance correction means 5A, "M2" is static balance moment of the dynamic unbalance correction means 6, and "M3" is static balance moment of the reluctor 2. "M1" through "M3" are given by the following expressions;

$$M1 = W1 \times R1$$

$$M2 = W2 \times R2$$

$$M3 = W3 \times R3$$

In order to maintain the dynamic balance of the flywheel 1, the dynamic unbalance correction means 6 may be provided so as to meet the following conditions;

$$M3 = M1 + M2$$

$$M1 \times L1 = M2 \times L2$$

As aforementioned, with the dynamic unbalance correction means 6 provided at the position closer to the side opposite to the static unbalance correction means 5A relative to the center of the reluctor 2 so that the composite moment (M1+M2) of the static balance moment M1 of the static unbalance correction means 5A and the static balance moment M2 of the dynamic unbalance correction means 6 is balanced with the static balance moment of the reluctor 2, the dynamic balance of the flywheel can be maintained. Thus, the vibration of the flywheel 1, which gives the rotor an undesirable problem when the engine rotates at the high speed, can be prevented, and therefore the waveform of the output signal of the pulser can be prevented from being distorted and the noise can be prevented from being generated from the pulser.

Figure 3A:
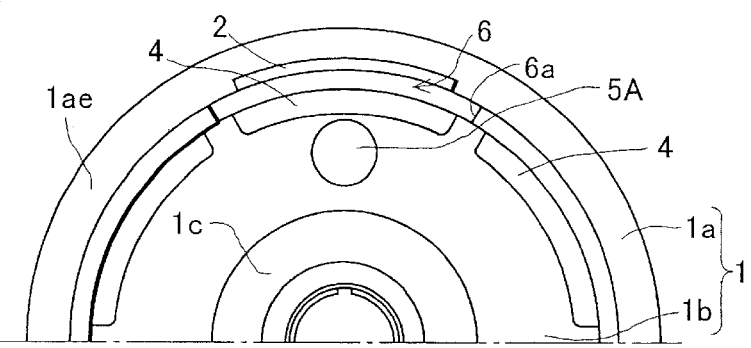
FIG. 3A is a front view of a rotor for a flywheel magneto generator constructed in accordance with another embodiment of the invention with only an upper half thereof shown.
Figure 3B:
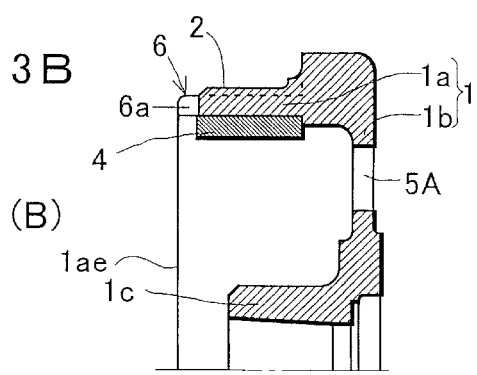
FIG. 3B is a longitudinal sectional view of the rotor of FIG. 3A with only an upper half shown in the same manner.

Referring now to FIGS. 3A and 3B, there is illustrated the rotor for the flywheel magneto generator constructed in accordance with another embodiment of the invention. In this embodiment, the recess 6a for the dynamic unbalance correction means 6 is formed in the end face 1ae of the peripheral wall portion 1a of the flywheel 1 on the opening side thereof. The other construction of the rotor of FIGS. 3A and 3B is identical to that of the rotor of FIGS. 1A and 1B. The rotor of FIGS. 3A and 3B can maintain the dynamic balance of the flywheel 1 by the dynamic unbalance correction means 6 in the same manner as that of FIGS. 1A and 1B.

FIG. 4 illustrates the rotor for the flywheel magneto constructed in accordance with further embodiment of the invention. In this embodiment, the dynamic unbalance correction means 6 comprises a pair of arc-like recesses 6a1 and 6a2 provided in the opening side end face 1ae of the peripheral wall portion 1a of the flywheel 1 symmetrically in rightward and leftward directions relative to the center position of the reluctor 2 on the peripheral direction thereof and extending in the peripheral direction of the peripheral wall portion 1a. Each of the recesses 6a1 and 6a2 for the dynamic unbalance correction means 6 may be formed by removing a portion of metal, which the opening side end of the peripheral wall portion 1a of the flywheel 1 is formed of, from the inner face of the opening side end of the peripheral wall portion 1a. With this dynamic unbalance correction means 6 provided in this manner, the dynamic unbalance of the flywheel 1 caused by the reluctor 2 and the static unbalance correction means 5A can be corrected so that the rotor can be prevented from vibrating when it rotates at the high speed.

In the embodiments of FIGS. 1A, 1B, 3A, 3B and 4, the static unbalance correction means 5A comprises the extension hole provided in the bottom wall portion 1b of the flywheel 1 at the position closer to the reluctor 2. Since the static unbalance correction means 5A may be provided just so that the mass of a portion of the flywheel 1 is lightened at the portion near the reluctor 2, it will be noted that the static unbalance correction means 5A is necessarily not required to comprise the extension hole and that it may comprise the recess or recesses provided in the bottom wall portion 1b of the flywheel 1 at the position closer to the reluctor 2.

Furthermore, although, in the embodiments of FIGS. 1A, 1B, 3A, 3B and 4, the static unbalance correction means 5A comprises only one extension hole, it may comprise a plurality of holes or recesses. For instance, two holes may be provided in the bottom wall portion 1b of the flywheel symmetrically in the rightward and leftward directions relative to the center position of the reluctor 2 in the peripheral direction thereof at the position closer to the reluctor 2 to form the static unbalance correction means 5A.

FIG. 5 illustrates the rotor of the invention constructed in accordance with further different embodiment. In this embodiment, there is provided static unbalance correction means 5B formed of a projection provided on the inner face of the bottom wall portion 1b of the flywheel 1 in the state where it is positioned on the side opposite to the reluctor 2 relative to the center axis of rotation of the flywheel 1. In order to correct the dynamic unbalance of the flywheel 1 caused by the reluctor 2 and the static unbalance correction means 5B, a recess 6a for constituting dynamic unbalance correction means 6 is formed in the portion of the end face of the peripheral wall portion 1a of the flywheel 1 on the opening side thereof. In the same manner as in the embodiment of FIG. 1, the recess 6a may be provided so that the center position of the recess 6a in the peripheral direction thereof corresponds to the center position of the reluctor 2 in the peripheral direction thereof and the both ends of the recess 6a terminate at the position exceeding the both ends of the reluctor 2 in the peripheral direction thereof.

As shown in FIG. 5, with the static unbalance correction means 5B of the projection provided on the inner face of the bottom wall portion of the flywheel in the state where it is positioned on the side opposite to the reluctor 2 relative to the center axis of rotation of the flywheel 1, the dynamic unbalance of the flywheel 1 caused by the reluctor 2 and the static unbalance correction means 5B is generated in the same manner as in the aforementioned embodiments. As illustrated in FIG. 5, the dynamic unbalance correction means 6 can correct the dynamic unbalance.

Figure 6A:
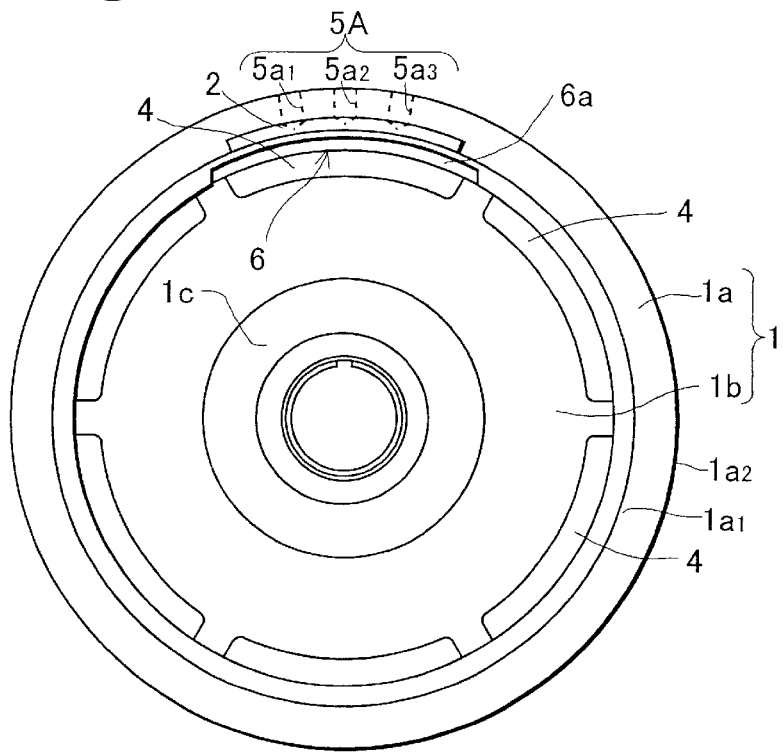
FIG. 6A is a front view of a rotor for a flywheel magneto generator constructed in accordance with further embodiment of the invention.
Figure 6B:
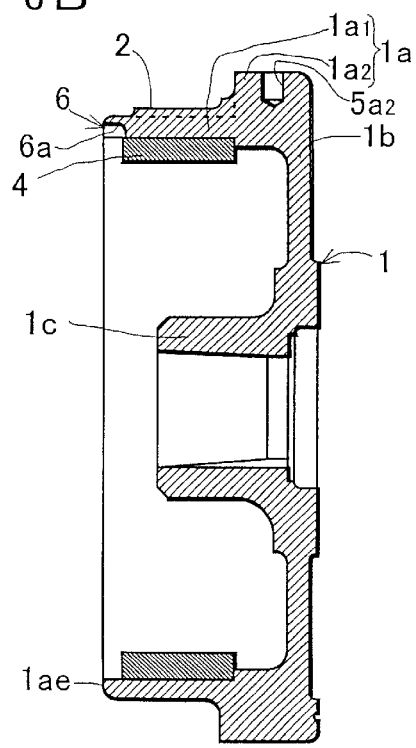
FIG. 6B is a longitudinal sectional view of the rotor of FIG. 6A.
Figure 7A:
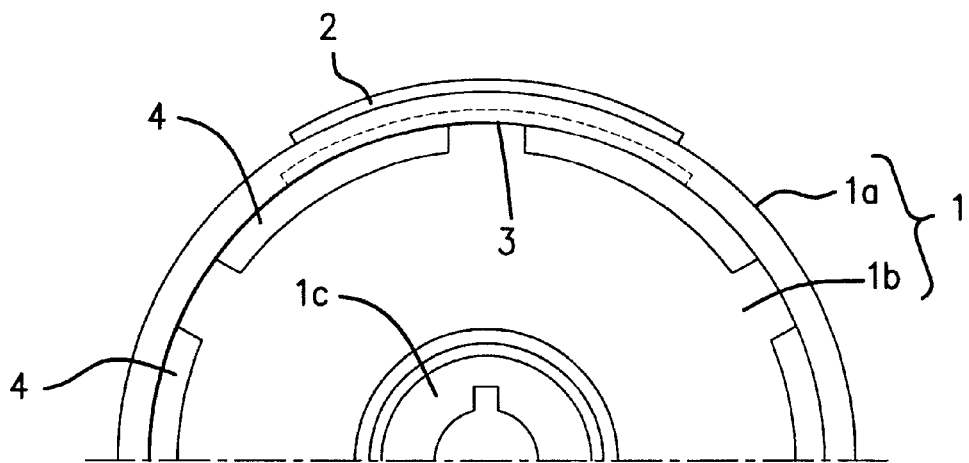
FIG. 7A is a front view of a rotor for a flywheel magneto generator having no static unbalance correction means required with only an upper half thereof shown.
Figure 7B:
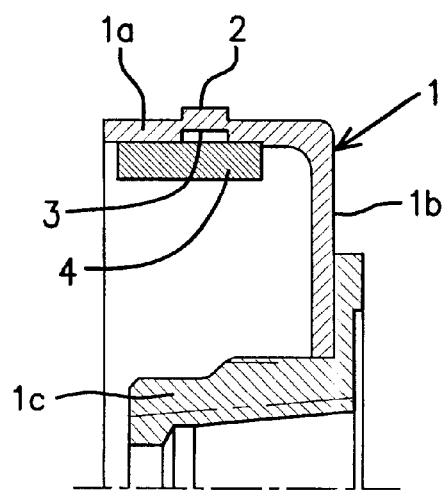
FIG. 7B is a longitudinal sectional view of the rotor of FIG. 7A with only an upper half shown in the same manner.
Figure 8A:
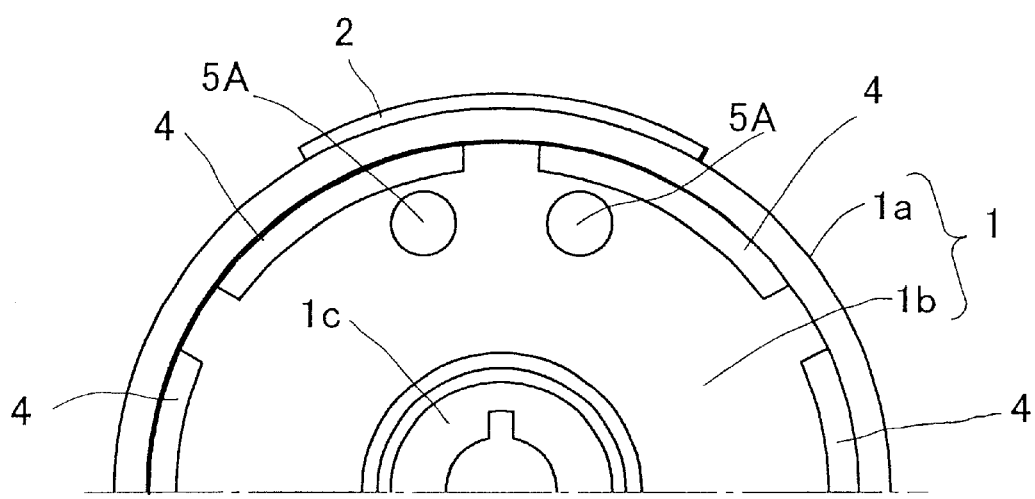
FIG. 8A is a front view of a conventional rotor for a flywheel magneto generator having static unbalance correction means constructed in accordance with an example with only an upper half thereof shown.
Figure 8B:
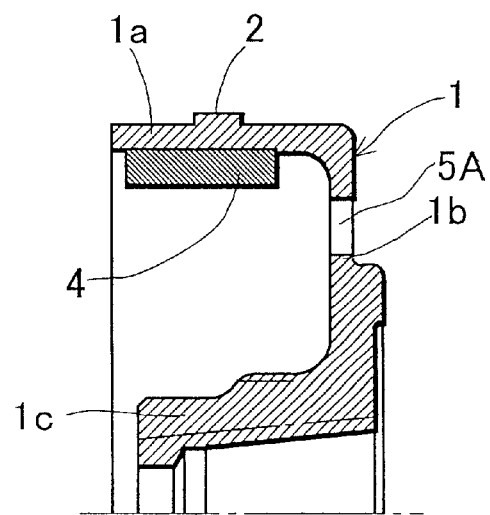
FIG. 8B is a longitudinal sectional view of the rotor of FIG. 8A with only an upper half shown in the same manner.
Figure 9A:
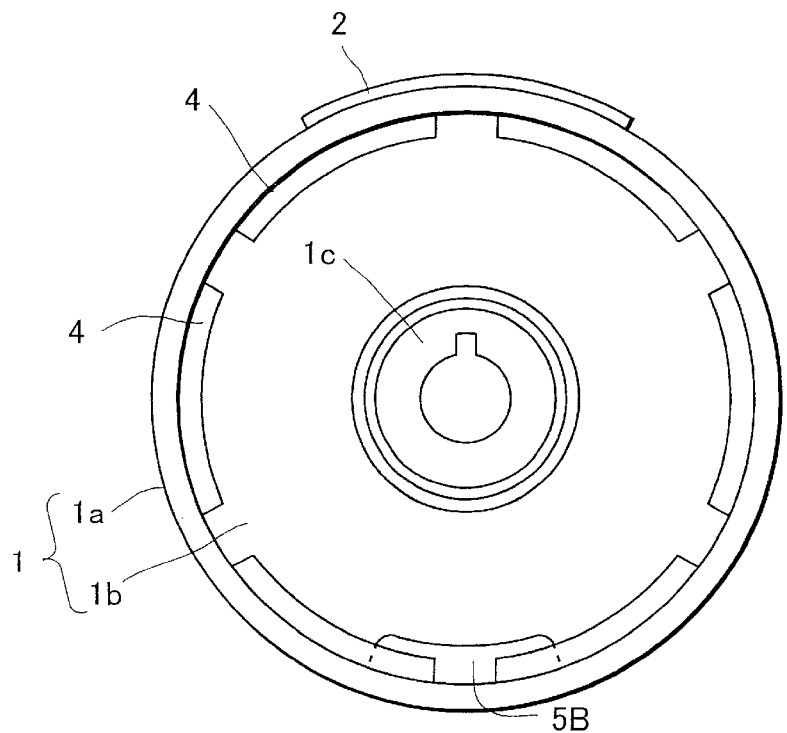
FIG. 9A is a front view of a conventional rotor for a flywheel magneto generator having static unbalance correction means constructed in accordance with another example with only an upper half thereof shown.
Figure 9B:
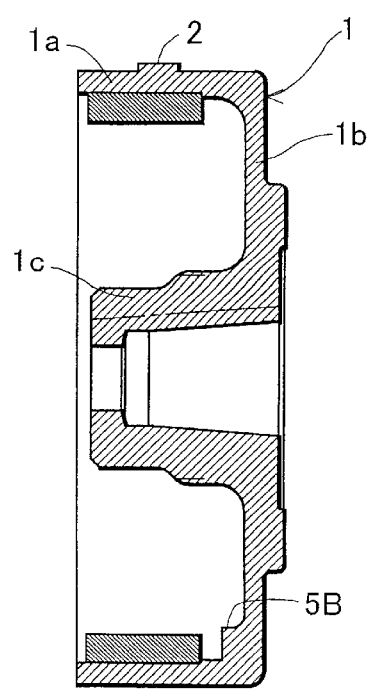
FIG. 9B is a longitudinal sectional view of the rotor of FIG. 9A with only an upper half shown in the same manner.
Figure 10:
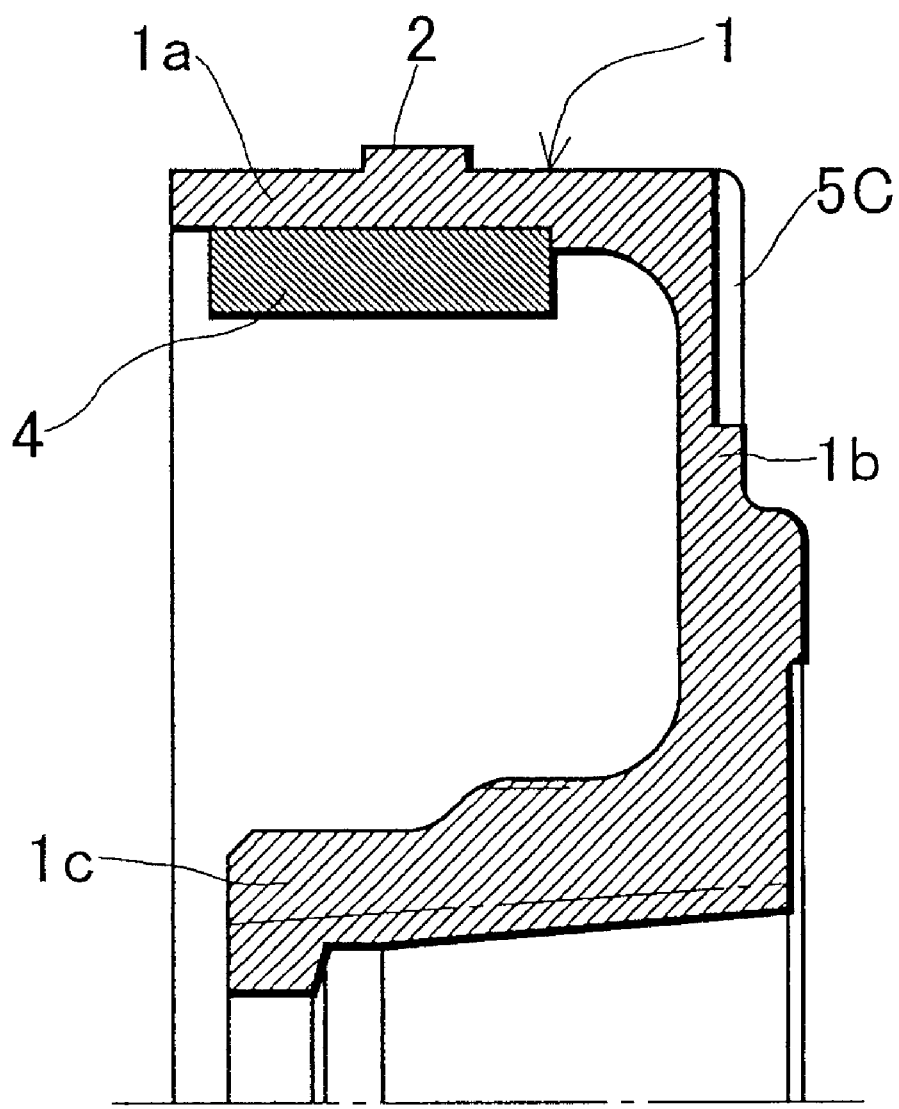
FIG. 10 is a longitudinal sectional view of a conventional rotor for a flywheel magneto generator having static unbalance correction means constructed in accordance with further different example with only an upper half thereof shown.

FIGS. 6A and 6B illustrate the rotor of the invention constructed in accordance with further embodiment. In this embodiment, the static unbalance correction means 5A comprises three recesses or openings 5a1 through 5a3 arranged in the peripheral direction of the flywheel 1 and provided in the second portion 1a2 of the peripheral wall portion 1a of the flywheel 1. The central recess 5a2 among the three recesses 5a1 through 5a3 is provided at the position corresponding to the center of the reluctor 2 in the peripheral direction of the flywheel 1 and the other two recesses 5a1 and 5a3 are provided symmetrically relative to the central recess 5a2. In order to correct the dynamic unbalance caused by the static unbalance correction means 5A, there is provided dynamic unbalance correction means 6 comprising an arc-like recess 6a formed in the end face 1ae of the peripheral wall portion of the flywheel 1 on the opening side thereof in the same manner as in the embodiment of FIGS. 1A and 1B.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A rotor for a flywheel magneto generator comprising a flywheel having a peripheral wall portion and a bottom wall portion to close one end of said peripheral wall portion as viewed in an axial direction of said flywheel with a reluctor of projection provided on an outer face of said peripheral wall portion and permanent magnets provided on an inner face of said peripheral wall portion of said flywheel, said flywheel comprising static unbalance correction means to correct static unbalance of said flywheel caused by a presence of said reluctor, said static unbalance correction means provided on said flywheel at a position where it is shifted to one side of said flywheel as viewed in the axial direction thereof relative to a center of said reluctor, said flywheel further comprising dynamic unbalance correction means to correct dynamic unbalance of said flywheel caused by said static unbalance correction means and said reluctor and said dynamic unbalance correction means provided at a position where it is shifted to the other side of said flywheel relative to said reluctor as viewed in the axial direction.

2. A rotor for a flywheel magneto generator as set forth in claim 1 and wherein said dynamic unbalance correction means is provided so that the composite moment of static balance moment of said static unbalance correction means and static balance moment of said dynamic unbalance correction means is balanced with static balance moment of said reluctor.

3. A rotor for a flywheel magneto generator comprising a flywheel having a peripheral wall portion and a bottom wall portion to close one end of said peripheral wall portion as viewed in an axial direction of said flywheel with a reluctor of projection provided on an outer face of said peripheral wall portion and permanent magnets provided on an inner face of said peripheral wall portion of said flywheel, said flywheel comprising static unbalance correction means provided on said bottom wall portion of said flywheel to correct static unbalance of said flywheel caused by a presence of said reluctor, said flywheel further comprising dynamic unbalance correction means of at least one recess to correct dynamic unbalance of said flywheel caused by said static unbalance correction means and said reluctor and said dynamic unbalance correction means provided in an end of said peripheral wall portion on the other side thereof as viewed in an axial direction of said flywheel at a position closer to said reluctor.

4. A rotor for a flywheel magneto generator as set forth in claim 3 and wherein mass of metal removed for forming said recess for said dynamic unbalance correction means is so set that the composite moment of static balance moment of said static unbalance correction means and static balance moment of said dynamic unbalance correction means is balanced with static balance moment of said reluctor.

5. A rotor for a flywheel magneto generator as set forth in claim 3 or 4 and wherein said static unbalance correction means comprises at least one hole or recess formed in said bottom wall portion at a position closer to said reluctor.

6. A rotor for a flywheel magneto generator as set forth in claim 3 or 4 and wherein said static unbalance correction means comprises a projection formed on an inner face of said bottom wall portion while it is positioned on a side opposite to said reluctor relative to a center axis of rotation of said flywheel.

* * * * *